(12) United States Patent
Kruglick

(10) Patent No.: US 9,013,991 B2
(45) Date of Patent: Apr. 21, 2015

(54) MULTICORE PROCESSOR INCLUDING TWO OR MORE COLLISION DOMAIN NETWORKS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 913 days.

(21) Appl. No.: 12/643,868

(22) Filed: Dec. 21, 2009

(65) Prior Publication Data
US 2011/0154345 A1 Jun. 23, 2011

(51) Int. Cl.
G06F 13/00 (2006.01)
G06F 12/00 (2006.01)

(52) U.S. Cl.
CPC ............... *G06F 12/00* (2013.01); *G06F 13/00* (2013.01)

(58) Field of Classification Search
None
See application file for complete search history.

(56) References Cited

U.S. PATENT DOCUMENTS

| | | | |
|---|---|---|---|
| 6,341,347 B1 * | 1/2002 | Joy et al. .................... | 712/228 |
| 6,625,740 B1 * | 9/2003 | Datar et al. ................. | 713/324 |
| 6,976,131 B2 * | 12/2005 | Pentkovski et al. ........... | 711/146 |
| 7,013,398 B2 * | 3/2006 | Zhao ............................ | 713/310 |
| 7,962,702 B1 * | 6/2011 | Bean ............................ | 711/154 |
| 8,180,963 B2 * | 5/2012 | Conte et al. ................. | 711/117 |
| 2002/0087828 A1 * | 7/2002 | Arimilli et al. ................ | 712/32 |
| 2007/0130445 A1 * | 6/2007 | Lau et al. ..................... | 712/11 |
| 2008/0072277 A1 * | 3/2008 | Cohen et al. ..................... | 726/1 |
| 2008/0222338 A1 * | 9/2008 | Balasubramanian et al. | 710/306 |
| 2009/0113439 A1 * | 4/2009 | Zettler et al. ................... | 718/103 |
| 2009/0307434 A1 * | 12/2009 | Sivaramakrishnan et al. ............................... | 711/147 |
| 2010/0235598 A1 * | 9/2010 | Bouvier ........................ | 711/163 |
| 2010/0325308 A1 * | 12/2010 | Keckler et al. ................ | 709/238 |
| 2011/0078486 A1 * | 3/2011 | Limaye et al. ................ | 713/600 |
| 2011/0113270 A1 * | 5/2011 | Carter et al. .................. | 713/320 |
| 2011/0167416 A1 * | 7/2011 | Sager et al. .................... | 717/149 |

OTHER PUBLICATIONS

Blelloch, Guy E.; Chowdhury, Rezaul A.; Gibbons, Phillip B.; Ramachandran, Vijaya; Chen, Shimin; Kozuch, Michael, Provably good multicore cache performance for divide-and-conquer algorithms, Society for Industrial and Applied Mathematics, SODA' 08 Proceedings of the ninteenth annual ACM-SIAM symposium on Discrete Algorithms, pp. 501-510, 2008.

Kang, D. I.; Suh, Jinwoo; McMahon, Janice O.; Crago, Stephen P, Preliminary Study toward Intelligent Run-time Resource Management Techniques for Large Multi-Core Architectures, 2007, accessed online on May 22, 2012 via www.eastisi.edu/~jsuh/publ/hpec07-dkang.doc.

Emma, P.G., Understanding some simple processor-performance limits, IBM Journal of Research and Development, vol. 41, No. 3, pp. 1-18, Feb. 19, 1997, accessed online on Sep. 30, 2013 via http://web.archive.org/web/20081011045731/http:/www.research.ibm.com/journal/rd/413/emma.html.

Bernstein, K., "New Dimensions in Microarchitecture," Harnessing 3D Integration Technologies, Mar. 6, 2007, pp. 13.

* cited by examiner

*Primary Examiner* — Hassan Kizou
*Assistant Examiner* — Roberta A Shand

(57) ABSTRACT

Implementations and techniques for multicore processors having a domain interconnection network configured to associate a first collision domain network with a second collision domain network in communication are generally disclosed.

18 Claims, 7 Drawing Sheets

600 A computer program product.

602 A signal bearing medium.

604 machine-readable instructions to facilitate communications between multiple collision domain networks of a multicore processor, which, when executed by one or more processor cores of the multicore processor, operatively enable the mutlicore processor to receive, via a traffic management core of the multicore processor, a first data result and a second data result from a domain interconnection network of the multicore processor, wherein the domain interconnection network is configured to facilitate communications associated with a first collision domain network of the multicore processor and with a second collision domain network of the multicore processor, wherein the first collision domain network is associated with a first set of processor cores in the multicore processor, and wherein the second collision domain network is associated with a second set of processor cores in the multicore processor; and/or reorder, via the traffic management core, a forwarding of the first data result and the second data result to the first collision domain network based at least in part on a priority of the first data result and a priority of the second data result.

| 606 a computer-readable medium. | 608 a recordable medium. | 610 a communications medium. |

FIG. 6

MULTICORE PROCESSOR INCLUDING TWO OR MORE COLLISION DOMAIN NETWORKS

BACKGROUND

Unless otherwise indicated herein, the approaches described in this section are not prior art to the claims in this application and are not admitted to be prior art by inclusion in this section.

Multicore processors have emerged as a mainstream computing platform in major market segments. As the number of processor cores on a given multicore processor increase, so too does the potential demand on that multicore processor's local memory. When the processor executes an instruction, for example, the processor first looks at its on-chip cache to find the data associated with that instruction to avoid performing a more time-consuming search for the data elsewhere (e.g., off-chip or on a main memory chip).

The present disclosure contemplates that systems with multiple cores may be required to handle multiple incoming application streams that may interfere with each other while seeking shared cache space. These multiple incoming application streams may cause a shared cache in the multicore processor system to operate inefficiently, resulting in poor overall performance. Conflict among processor cores for the use of a shared cache can be expensive in terms of both latency and power as a result of additional requests to off-chip memory. Other factors relating to multiple cores can also reduce efficiency.

The present disclosure also contemplates that multicore processors may experience both higher cache miss rates and much higher penalties for cache misses. Further, as core counts improve bus congestion and cache miss penalties may rise at exponential rates. Cache calls, data exchange, and I/O may all be impacted in cases where cache-misses or other events lead to bus congestion that may further degrade performance.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 is an illustration of an example computer program product; and

DETAILED DESCRIPTION

Figure 1:
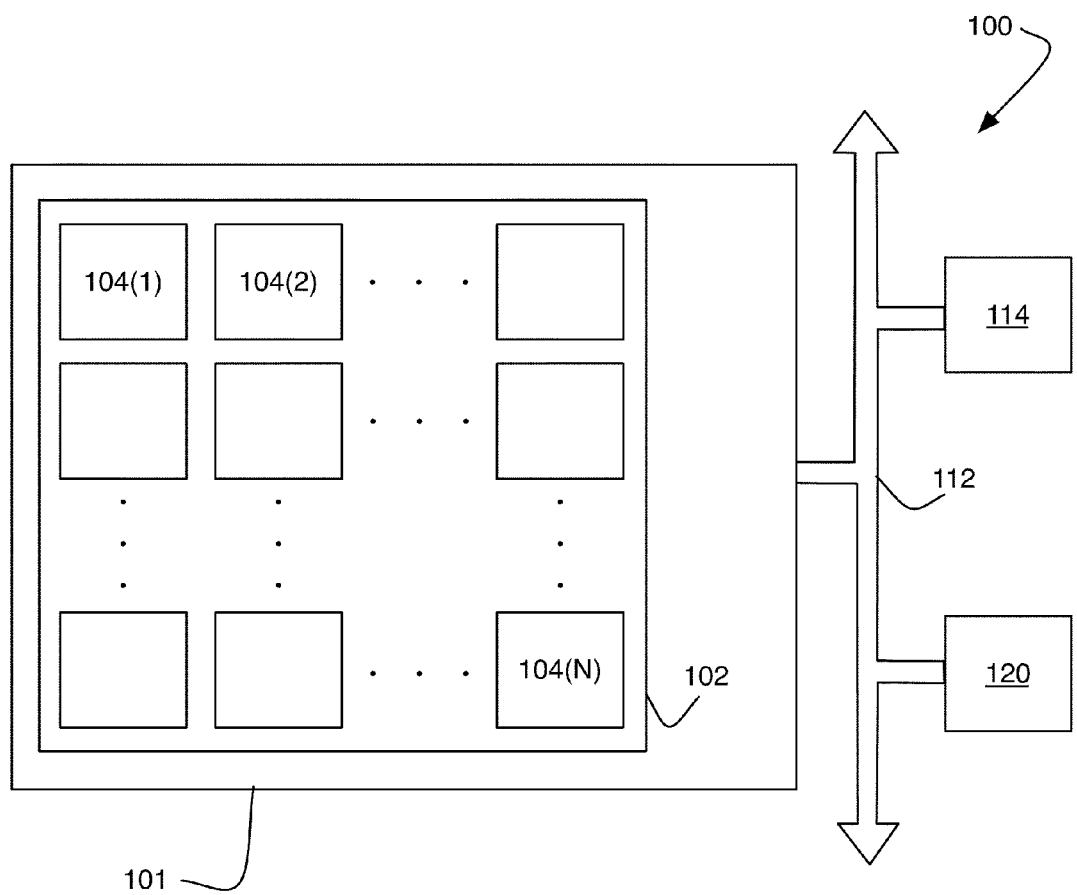
FIG. 1 is an illustration of an example computing device that includes a multicore processor.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to multicore processors having a domain interconnection network configured to associate a first collision domain network with a second collision domain network in communication.

The number of processor cores contained in a single multicore processor continue to rise. The present disclosure recognizes that as the number of processor cores rises, communications may increasingly become a limiting factor in multicore processor performance.

In multicore processors, communication traffic may be sent from individual processor cores. For example, in some multicore processors all of the individual processor cores may be networked together in a single collision domain. In such cases where all of the individual processor cores may be networked together in a single collision domain, randomly timed communications from individual processor cores may result in collisions of competing communications among those individual processor cores.

In some cases, a given processor core may generate a significant amount of communication traffic. At some level, such a significant amount of communication traffic from a given processor core may impede the efficient operation of other processor cores associated with a given multicore processor. For example, a given processor core may generate a significant amount of communication traffic in cases where the given processor core is experiencing cache misses.

In cases where the given processor core is experiencing cache misses, it may not be efficient to permit the given processor core to utilize an increased portion of bandwidth to accommodate the associated communication traffic. Such cache misses may be indicative of poor performance of the given processor core. Poor performance of the given processor core may adversely impact the overall performance of the multicore processor; additionally, this impact on the performance of the multicore processor may be exacerbated if the poorly performing processor core is permitted an increased portion of bandwidth to accommodate the associated communication traffic. For example, the increased portion of bandwidth may not appreciably improve the performance of the poorly performing processor core, and may decrease the portion of bandwidth available to better functioning portions of the multicore processor.

As noted above, in some multicore processors all of the individual processor cores may be networked together in a single collision domain. In such a single collision domain, randomly timed communications from individual processor cores may result in collisions of competing communications among those individual processor cores.

Alternatively, a multicore processor may be divided into a plurality of collision domains. With a plurality of collision domains, randomly timed communications from individual processor cores may result in collisions of competing communications; however, such collisions may be decreased and/or managed by increasing the number of collision domains that a given multicore processor may be divided into. By dividing a multicore processor into a plurality of collision domains, collisions of competing communications occurring in a first collision domain may be restricted from impacting the communications occurring in a second collision domain.

FIG. 1 is an illustration of an example computing device 100 that includes a multicore processor 101 that is arranged in accordance with at least some embodiments of the present disclosure. In the illustrated example, computing device 100 may include multicore processor 101, including a single integrated circuit having a processing core array 102. In other examples a multicore processor 101 may include processor cores on separate integrated chips.

The processing core array 102 may include some number (N) of processing cores 104(1)-104(N). Any suitable number of processing cores 104 may be provided. Individual processing cores 104 may generally be of any desired configuration including but not limited to a microprocessor (μP), a microcontroller (μC), a digital signal processor (DSP), the like, or combination thereof. Individual processing cores 104 may include logic for executing program instructions as well as other functional blocks such as an arithmetic logic unit (ALU), a floating point unit (FPU), a digital signal processing (DSP) core, registers, accumulators, etc.

As stated above, multicore processor 101 may have any suitable number of processing cores 104. For example, multicore processor 101 may have two (2) processing cores 104, four (4) processing cores 104, tens of processing cores 104, and even hundreds or more of processing cores 104. Some multicore processors 101 may be homogeneous, such that each of the processing cores 104 use a single type of core design. Other multicore processors 101 may be heterogeneous, such that one or more of the processing cores 104 may be different from one or more of other processing cores 104, and individual processing cores 104 or a subset of processing cores 104 may be designed for a different role in the multicore processor 101.

The computing device 100 may include a bus 112 that may support a communication interface between the multicore processor 101 and another component 114, as will be described in greater detail below with respect to FIG. 7. Example components 114 may include, but are not limited to, input-output (I/O) devices, external sensors, or the like, or may be a resource shared by any subset of the processing cores 104. The bus 112 may support a communication interface between the multicore processor 101 and main memory 120, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile.

FIG. 1 is an illustrative schematic of a multicore processor and does not illustrate physical location of the components illustrated therein. It is appreciated that the multicore processor 101 described herein is illustrative and that examples and modifications are possible. Design choices may be driven by, for example, considerations of hardware size and complexity versus performance, thermal energy and heat dissipation, processor speed, overall throughput, etc.

Figure 2:
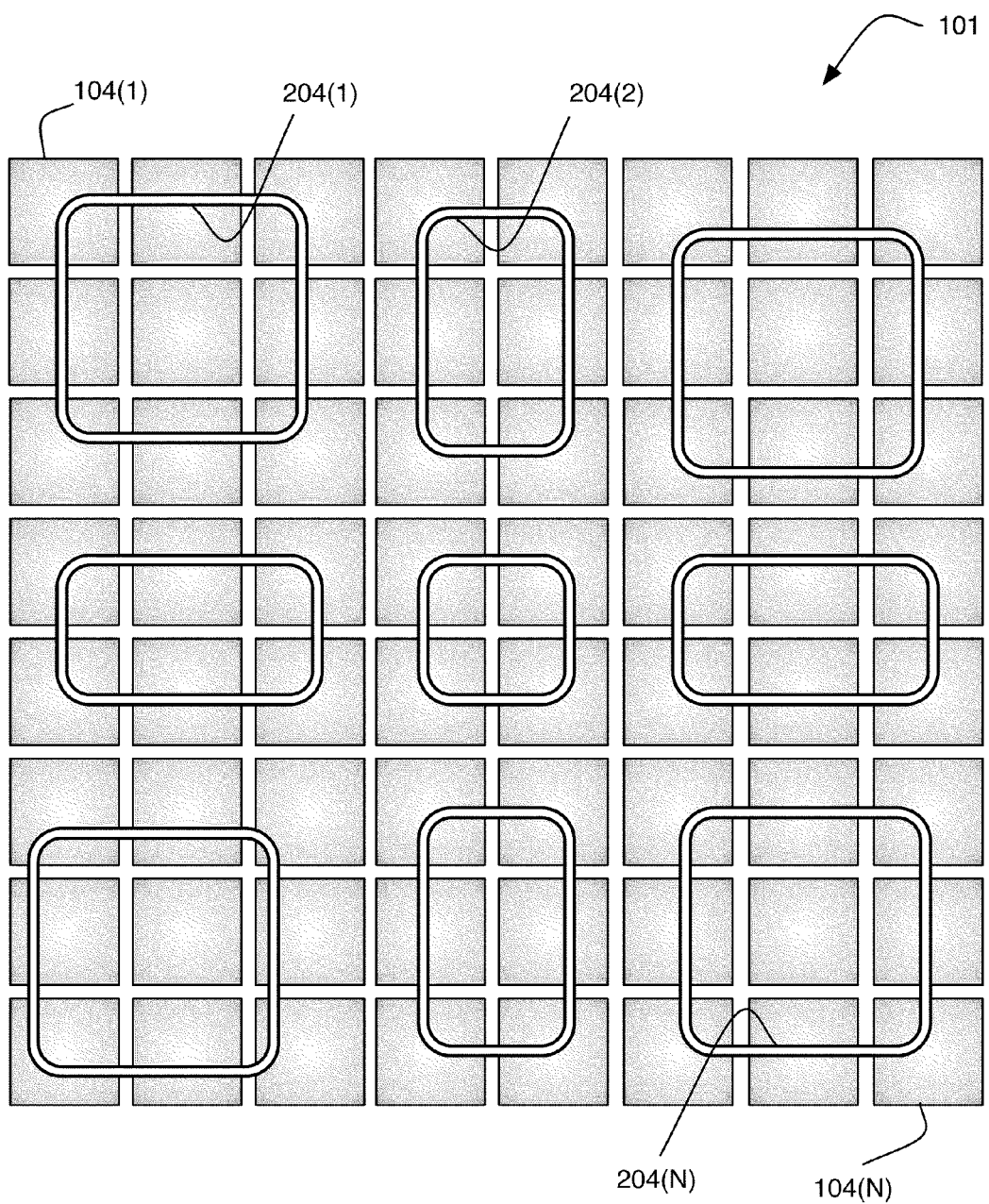
FIG. 2 is an illustrative diagram of an example multicore processor including two or more collision domain networks.

FIG. 2 is an illustrative diagram of an example multicore processor 101 including two or more collision domain networks 204, arranged in accordance with at least some embodiments of the present disclosure. In the illustrated example, multicore processor 101 may include a plurality of processor cores 104 arranged in some number (N) of collision domain networks 204(1)-204(N). Any suitable number of collision domain networks 204 may be provided. A first collision domain network 204(1) may comprise a first set of processor cores 104 that are configured in communication with one another. A second collision domain network 204(2) may comprising a second set of processor cores 104 that are configured in communication with one another. As used herein, the term "collision domain network" may refer to a communication region that allows delivery of messages from any processor core within the collision domain network to any other processor core within the collision domain network, while delivery of messages outside the collision domain network pass through a collision blocking interface.

The first collision domain network 204(1) may be restricted from impacting the communications occurring in one or more of the other collision domain networks 204. For example, with a plurality of collision domain networks 204, randomly timed communications from individual processor cores 104 may result in collisions of competing communications confined to individual collision domain networks 204 instead of the entire multicore processor 101. Such collisions may be decreased and/or managed by increasing the number of collision domain networks 204 that the multicore processor 101 may be divided into. By dividing the multicore processor 101 into a plurality of collision domain networks 204, collisions of competing communications occurring in the first collision domain network 204(1) may be restricted from impacting the communications occurring in the second collision domain network 204(2).

As illustrated, individual collision domain networks 204 may be heterogeneous, such that one or more of the collision domain networks 204 may be sized to include a different number of the processor cores 104 from one or more of the other collision domain networks 204. For example, an individual collision domain network 204(1) may be designed for a different role in the multicore processor 101 from one or more of the other collision domain networks 204. For example, a first set of processor cores 104 in a first collision domain network 204(1) may include a greater number of processing cores 104 than a second set of processor cores 104 in another collision domain network 204(2).

In other cases, individual collision domain networks 204 may be of homogeneous design, and may include the same number of the processor cores 104 with respect to other collision domain networks 204. For example, a first set of processor cores in a first collision domain network 204(1) may include the same number of processing cores 104 as a second set of processor cores 104 in another collision domain network 204(N).

As stated above, multicore processor 101 may have any suitable number of collision domain networks 204. For example, multicore processor 101 may have two (2) collision domain networks 204, four (4) collision domain networks 204, nine (9) collision domain networks 204, or the like. Some multicore processors 101 may be homogenous, such that each of the collision domain networks 204 use a single type of core design. In such a case, individual collision domain networks 204 may include a subset of processing cores 104 that is of a homogeneous design with respect to other collision domain networks 204. For example, a first set of processor cores 104 in a first collision domain network 204(1) may correspond to a first type of processor core and a second set of processor cores 104 in a second collision domain network 204(2) may correspond to a second type of processor cores that is different from the first type of processor cores.

In some alternative examples, other multicore processors 101 may be heterogeneous, such that one or more of the processing cores 104 may be different from one or more of other processing cores 104, and individual processing cores 104 or a subset of processing cores 104 may be designed for a different role in the multicore processor 101. In such examples, individual collision domain networks 204 may include a subset of processing cores 104 that is of a heterogeneous design with respect to other collision domain networks 204. For example, each of a first set of processor cores 104 in a first collision domain network 204(1) and each of a second set of processor cores 104 in of another collision domain network 204(N) may correspond to a same type of processor core.

Figure 3:
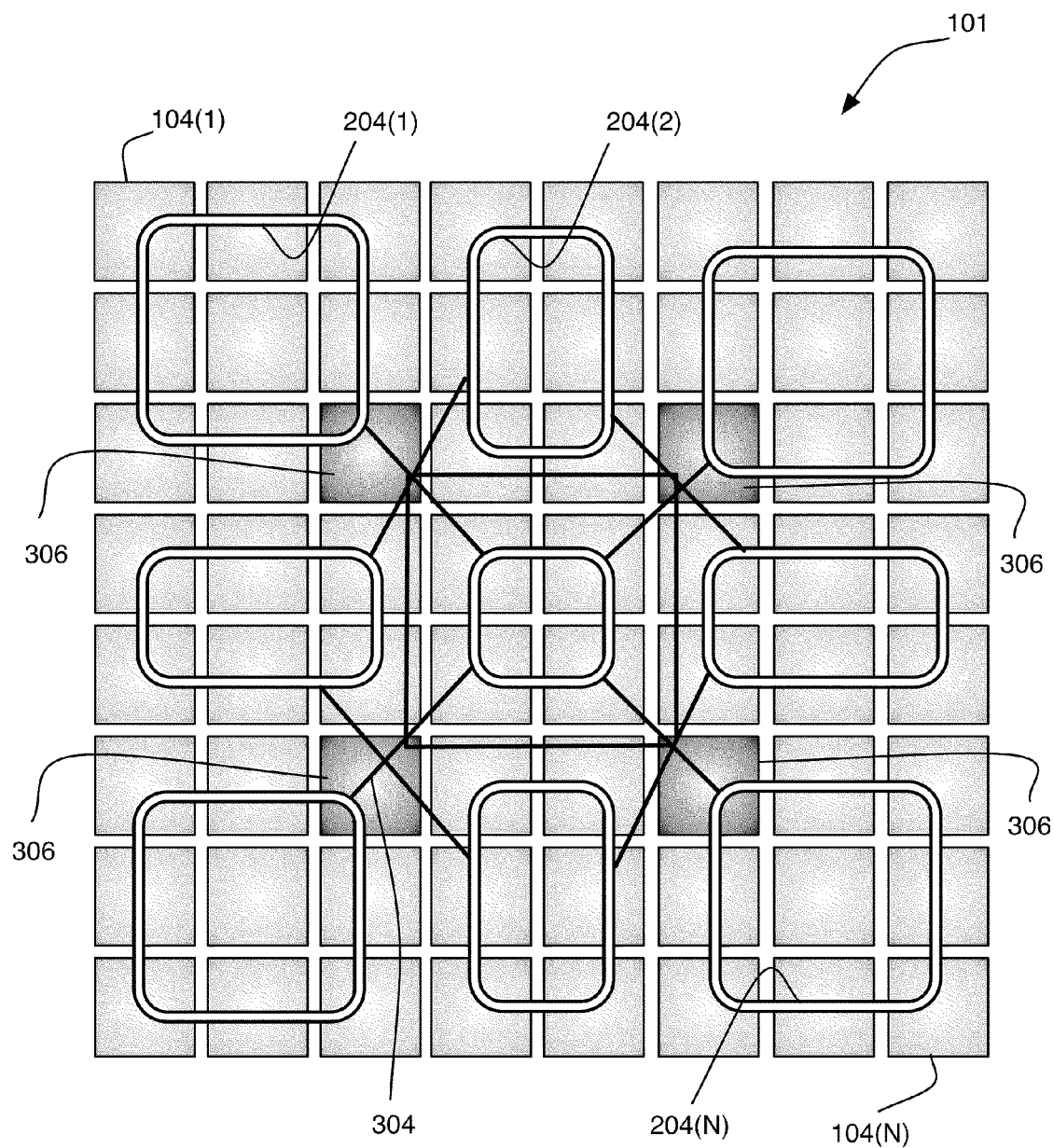
FIG. 3 is an illustrative diagram of an example multicore processor including a domain interconnection network.

FIG. 3 is an illustrative diagram of an example multicore processor 101 including a domain interconnection network 304, arranged in accordance with at least some embodiments of the present disclosure. In the illustrated example, multicore processor 101 may include a domain interconnection network 304 configured to facilitate communications associated with the collision domain networks 204. For example, the domain interconnection network 304 may be configured to associate with the first collision domain network 204(1) and with the second collision domain network 204(2) in communication. The domain interconnection network 304 may be coupled to bus 112 (see FIG. 1) via one or more bus connections.

Additionally, the plurality of processor cores 104 of multicore processor 101 may include one or more traffic management cores 306. Such a traffic management core 306 may be associated with the domain interconnection network 304 and may be configured to facilitate communications between the domain interconnection network 304 and one or more of the collision domain networks 204. Examples of facilitating communications may include, but is not limited to, any desired type of control of communications such as: sending communication requests and receiving replies, assembling or encoding communication messages, disassembling or decoding communication messages, forwarding or relaying communication messages, receiving or monitoring communication messages, rejecting communication messages, and/or any other function commonly associated with network management and interconnection. An example traffic management core 306 may be associated with the domain interconnection network 304 and may be configured to facilitate communications between the domain interconnection network 304 and a single collision domain network 204, or multiple collision domain networks 204.

In some examples, two or more traffic management cores 306 may be associated with the domain interconnection network 304 and may be configured to facilitate communications between the domain interconnection network 304 and a single collision domain network 204. For example, such traffic management cores 306 may be configured to allow for increased bandwidth handling of communications between the domain interconnection network 304 and a single collision domain network 204 as individual traffic management cores 306 may have limits and may be inspecting individual packets. In examples where such a traffic management core 306 spans multiple collision domain networks 204, a traffic management core 306 might be designed, to a certain degree, like a processor core 104 with connections to multiple collision domain networks 204. For example, a traffic management core 306 spanning multiple collision domain networks 204 may cease to serve a traffic management function—rendering the traffic management core 306 as operating in a similar manner to a processor core 104 with connections to one or more collision domain networks 204.

As will be discussed with greater detail below with respect to FIG. 4, such a traffic management core 306 may be configured to restrict one or more collision domain networks 204. For example, such a traffic management core 306 may be configured to facilitate communications between the domain interconnection network 304 and the first collision domain network 204(1) by restricting the first collision domain network 204(1) from the domain interconnection network 304. Such restriction may be based at least in part on a determination of excessive data requests by the first collision domain network 204(1). As used herein, the term "restrict," or the like, may include blocking just certain packets or types of packets, or might be a matter of reducing priority of packets from the first collision domain network 204(1).

For example, the traffic management core 306 may be configured to monitor communications associated with those individual processors 104 that are networked together in a given collision domain network 204. The traffic management core 306 may monitor these communications in order to restrict a given collision domain network 204 under certain circumstances. In some examples, a specific processor core 104 may operate as a saboteur to multicore processor 101 by sending excessive data requests, where a significant amount of communication traffic may result in specific processor core 104 experiencing cache misses. In cases where the specific processor core 104 is experiencing cache misses, it may not be efficient to permit the specific processor core 104 to utilized an increased portion of bandwidth to accommodate the associated communication traffic. Such cache misses may be indicative of poor performance of the specific processor core 104. Poor performance of the specific processor core 104 may adversely impact the overall performance of the multicore processor 101. Additionally, this impact on the performance of the multicore processor 101 may be exacerbated if the poorly performing processor core 104 is permitted an increased portion of bandwidth to accommodate the associated communication traffic. For example, the increased portion of bandwidth may not appreciably improve the performance of the poorly performing processor core 104, and may decrease the portion of bandwidth available to better functioning portions of the multicore processor 101.

As will be discussed with greater detail below with respect to FIG. 5, the traffic management core 306 may be configured to reorder the forwarding of data results. For example, in cases where a later received second data result has a highest priority, traffic management core 306 may begin forwarding the second data result to collision domain network 204(1), and pause the forwarding of an earlier received first data result to collision domain network 204(1). Once the highest priority data result has been transmitted the traffic management core 306 may be configured to begin forwarding the next highest priority data result. In cases where the second data result has the highest priority, traffic management core 306 may finish forwarding the second data result to the collision domain network 204(1), and then resume forwarding the first data result to the collision domain network 204(1). Accordingly, traffic management core 306 may be configured to facilitate communication between the domain interconnection network 304 and the first collision domain network 204(1) by reordering the forwarding of a first data result and a second data result to the first collision domain network 204(1). Such a reordering may be based at least in part on a priority of the first data result and a priority of the second data result. For example, the traffic management core 306 may be configured to monitor communications in order to manage the timing and/or order of the communications associated with individual processors 104 that are networked together in a given collision domain network 204. In some examples, cache storage of the traffic management core 306 may configured to store lower priority data results while forwarding on higher priority data results.

Alternatively, the domain interconnection network 304 may be omitted from the multicore processor 101. For example, the traffic management cores 306 may be configured to associate with one or more of the collision domain networks 204 in communication without the domain interconnection network 304, e.g. with the first collision domain network 204(1) and with the second collision domain network 204(2). In some examples, one or more of the traffic management cores 306 may be coupled to bus 112 (see FIG. 1) via one or more bus connections, and may be configured to facilitate communications between bus 112 (see FIG. 1) and one or more of the collision domain networks 204.

Some or all of the traffic management cores 306 may be special purpose cores specifically designed to be configured to restrict one or more collision domain networks 204 and/or to be configured to reorder forwarding of data results. In some examples, some or all of the traffic management cores 306 may be general purpose cores programmed to perform particular functions to restrict one or more collision domain networks 204 and/or to reorder forwarding of data results.

In examples where some or all of the traffic management cores 306 are general purpose cores programmed to perform particular functions, it may be possible to reconfigure the number and arrangement of connections between the collision domain networks 204 and the domain interconnection network 304. For example, some or all of the processor cores 104 may have connections to multiple collision domain networks 204 and may be selectively programmed to operate or not operate as traffic management cores 306.

Figure 4:
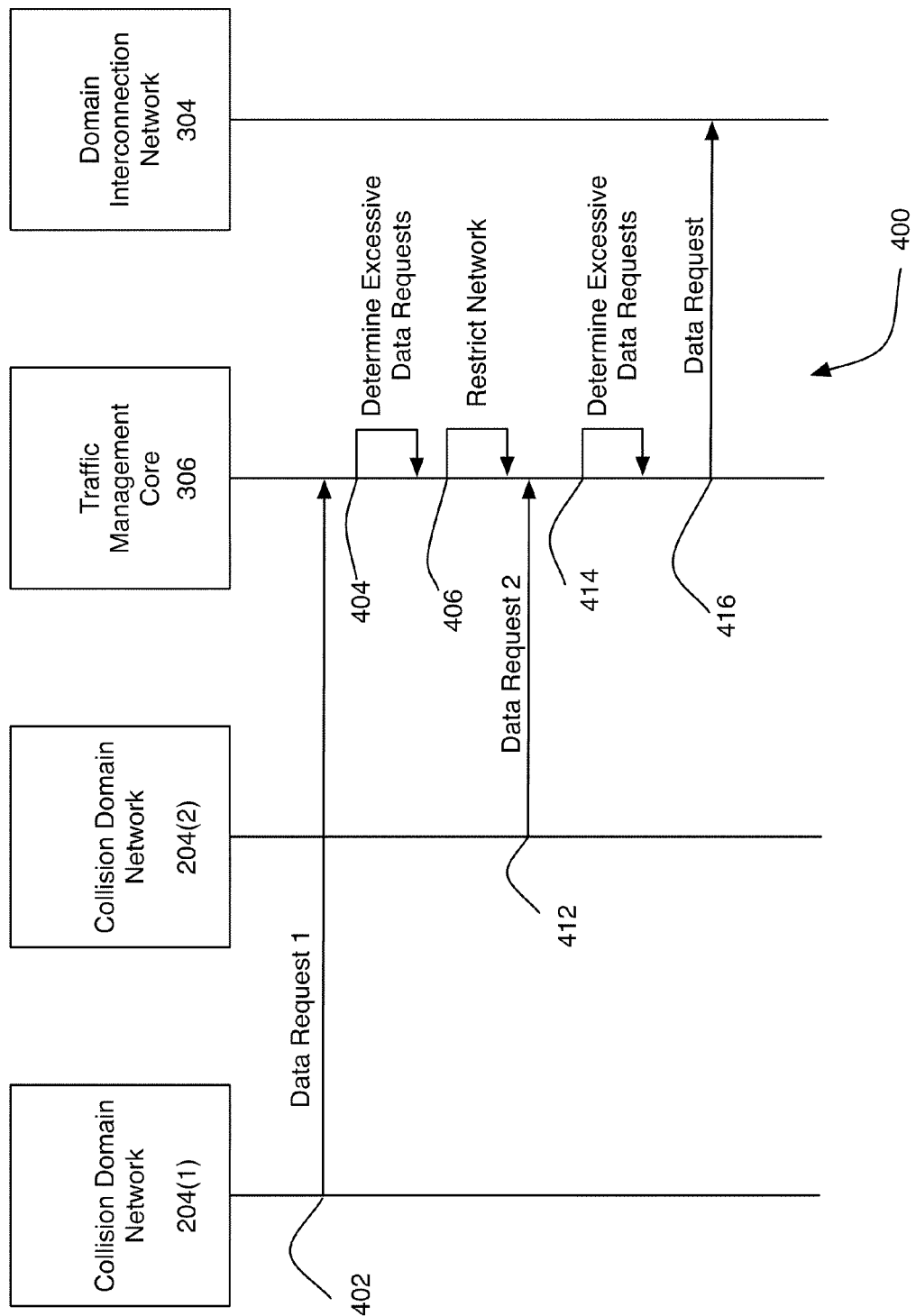
FIG. 4 is an illustration of an example process for operation of a multicore processor.

FIG. 4 is an illustration of an example process 400 for operation of a multicore processor, arranged in accordance with at least some embodiments of the present disclosure. In the illustrated example, process 400, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 4 may be practiced in various implementations. For example, although process 400, as shown in FIG. 4, comprises one particular order of blocks or actions, the order in which these blocks or actions are presented does not necessarily limit claimed subject matter to any particular order. Likewise, intervening actions not shown in FIG. 4 and/or additional actions not shown in FIG. 4 may be employed and/or some of the actions shown in FIG. 4 may be eliminated, without departing from the scope of claimed subject matter. Process 400 may include one or more of operations 402, 404, 406, 412, 414, and/or 416.

As illustrated, process 400 may be implemented for operation of a multicore processor to restrict one or more collision domain networks 204. Processing may begin at operation 402, "data request 1", where a data request 1 may be transmitted from the first collision domain network 204(1) to traffic management core 306. Processing may continue from operation 402 to 404, "determine excessive data requests", where the traffic management core 306 may be configured to receive the data request 1 and may determine if excessive data requests are being received from the first collision domain network 204(1) based at least in part on the data request. As used herein, the term "excessive data requests" may refer to data requests that exceed threshold based at least in part on a volume of data requests, frequency of data requests, the like, or combinations thereof. Processing may continue from operation 404 to operation 406, "restrict network", where the traffic management core 306 may be adapted to restrict the first collision domain network 204(1) from the domain interconnection network 304 based at least in part on the determination of excessive data requests.

Operations 412-416 may occur after or before operations 402-406. At operation 412, "data request 2", a data request 2 may be transmitted from the second collision domain network 204(2) to traffic management core 306. Operation 412 may be followed by operation 414, "determine excessive data requests", where the traffic management core 306 may be adapted to receive the data request 2 and may determine if excessive data requests are being received from the second collision domain network 204(2) based at least in part on the data request 2. Operation 414 may be followed by operation 416, "data request", where the traffic management core 306 may forward the data request from the second collision domain network 204(2) to the domain interconnection network 304 based at least in part on the determination of a lack of excessive data requests.

Figure 5:
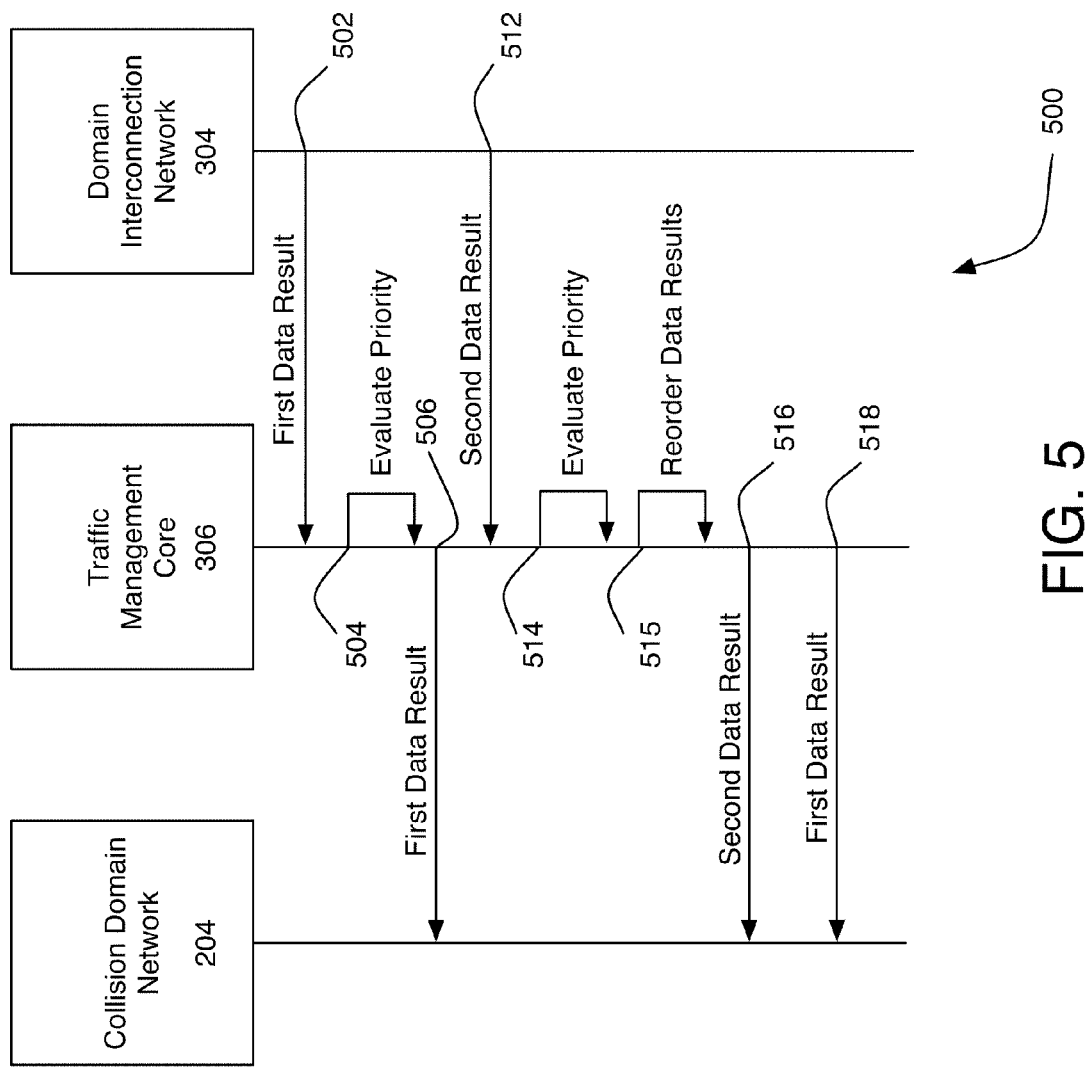
FIG. 5 is an illustration of another example process for operation of a multicore processor.

FIG. 5 is an illustration of another example process 500 for operation of a multicore processor, arranged in accordance with at least some embodiments of the present disclosure. In the illustrated example, process 500, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 5 may be practiced in various implementations. For example, although process 500, as shown in FIG. 5, comprises one particular order of blocks or actions, the order in which these blocks or actions are presented does not necessarily limit claimed subject matter to any particular order. Likewise, intervening actions not shown in FIG. 5 and/or additional actions not shown in FIG. 5 may be employed and/or some of the actions shown in FIG. 5 may be eliminated, without departing from the scope of claimed subject matter. Process 500 may include one or more of operations 502, 504, 506, 512, 514, 515, 516 and/or 518.

As illustrated, process 500 may be implemented for operation of a multicore processor to reorder forwarding of data results. Process 500 may begin at operation 502, "first data result", where the traffic management core 306 may be configured to receive a first data result from the domain interconnection network 304. Processing may continue from operation 502 to operation 504, "evaluate priority", where the traffic management core 306 may be configured to evaluate the priority of the first data result. Operation 504 may be followed by operation 506, "first data result", where the traffic management core 306 may be configured to begin forwarding the highest priority data result to the collision domain network 204 based at least in part on the priority of the first data result. As illustrated, in cases where the first data result has the highest priority, traffic management core 306 may be configured to begin forwarding the first data result to the collision domain network 204.

Operation 506 may be followed by operation 512, "second data result", where the traffic management core 306 may be arranged to receive a second data result from the domain interconnection network 304. Processing may continue from operation 512 to operation 514, "evaluate priority", where the traffic management core 306 may be configured to evaluate the priority of the first data result and the second data result. Operation 514 may be followed by operation 515, "reorder data result", where the traffic management core 306 may be adapted to reorder a forwarding of the first data result and the second data result to the collision domain network 204 based at least in part on the priority of the first data result and the priority of the second data result.

Operation 515 may be followed by operation 516, "second data result", where the traffic management core 306 may be arranged to begin forwarding the highest priority data result to the collision domain network 204 based at least in part on the priority of the first data result. As illustrated, in cases where the second data result has the highest priority, traffic management core 306 may begin forwarding the second data result to the collision domain network 204, and pause the forwarding of the first data result to the collision domain network 204. Operation 516 may be followed by operation 518, "first data result", where the traffic management core 306 may be configured to begin forwarding the next highest priority data result once the highest priority data result has been transmitted. As illustrated, in cases where the second data result has the highest priority, traffic management core 306 may finish forwarding the second data result to the collision domain network 204, and then resume forwarding the first data result to the collision domain network 204.

In some examples, the first data result and the second data result may be received simultaneously. In cases where the second data result has the highest priority, traffic management core 306 may forward the second data result to the collision domain network 204, and then forward the first data result to the collision domain network 204.

In a similar process, a multicore processor may reorder forwarding of data requests. For example, traffic management core 306 may receive a first data request from collision domain network 204(1) (see FIG. 4) and a second data request from collision domain network 204(2) (see FIG. 4). In cases where the second data quest has the highest priority, traffic management core 306 may forward the second data request to the domain interconnection network 304, and then forward the first data request to the domain interconnection network 304.

Data results forwarded from the traffic management core 306 to the collision domain network 204 may be moved directly from L1 cache in the traffic management core 306 to L1 cache in a processor core 104 of the collision domain network 204. Such a direct transfer may be made without involving the L2 cache of the processor core 104 of the collision domain network 204. For example, L1 cache for individual processor cores 104 may be assigned corresponding network addresses, then data results may include network address information that indicates what processor core 104 the data result is directed to. Accordingly, the network address information may indicate storage in the L1 cache of the processor core 104, thereby bypassing the L2 cache.

Referring back to FIG. 3, in operation, multiple collision domain networks 204 may lead to some processing and/or communication efficiencies. In some examples, multicore processor 101 may be configured to assign related tasks might be to a certain collision domain, instead of randomly assigning the tasks across an entire multicore processor 101. In such examples, two processes operating on the multicore processor 101 may be communicating with each other. These two processes may be more efficiently executed if both processes are located in a single collision domain network 204, instead of being spread across an entire multicore processor 101.

FIG. 6 illustrates an example computer program product 600 that is arranged in accordance with at least some embodiments of the present disclosure. Computer program product 600 may include a signal bearing medium 602. Signal bearing medium 602 may include one or more machine-readable instructions 604 to facilitate communications between multiple collision domain networks of a multicore processor, which, when executed by one or more processor cores of the multicore processor, may operatively enable the multicore processor to provide the functionality described above with respect to FIG. 4 and/or FIG. 5. Thus, for example, referring to the system of FIG. 1, computer device 100 or multicore processor 101 may undertake one or more of the actions shown in FIG. 4 and/or FIG. 5 in response to instructions 604 conveyed by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.).

Figure 7:
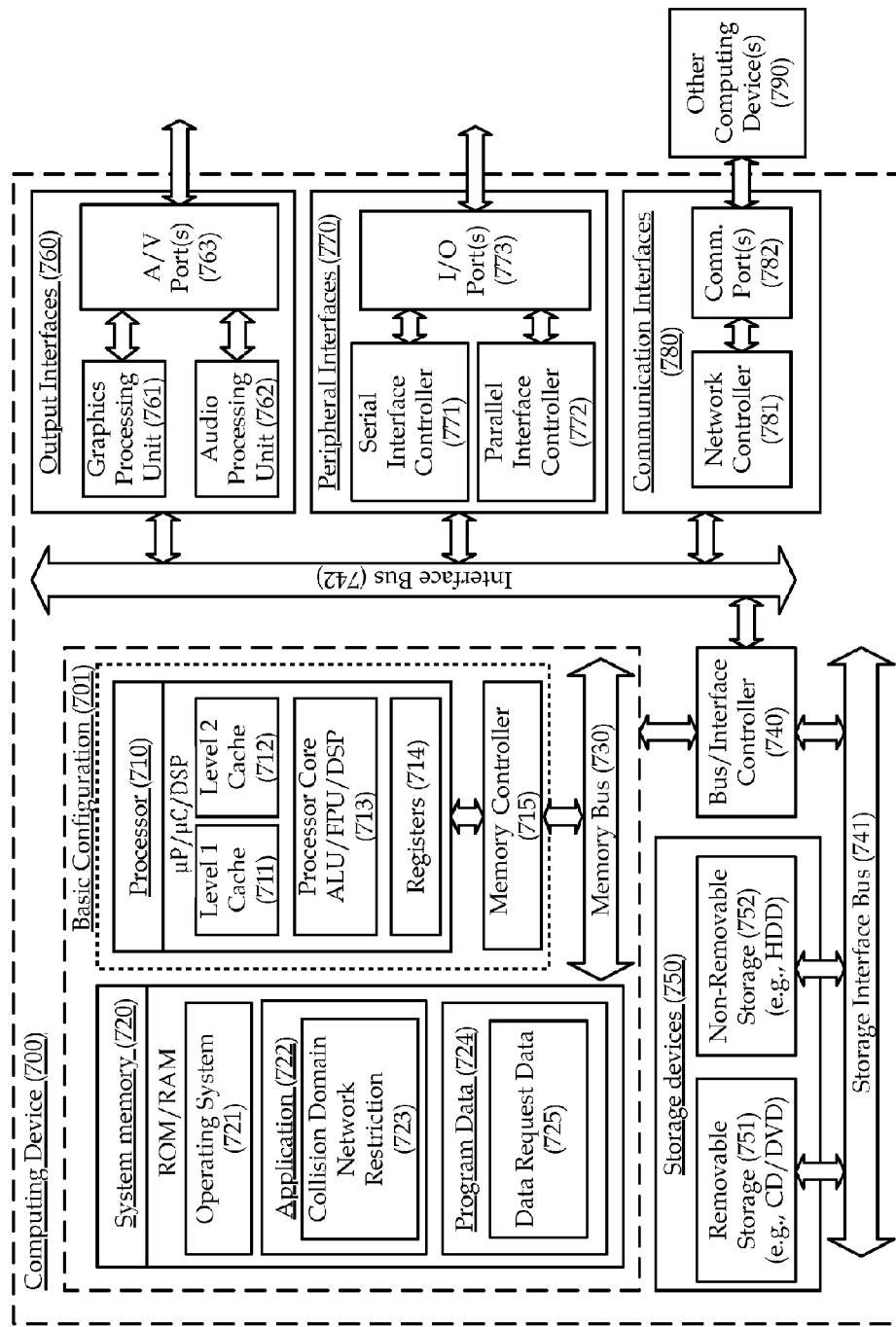
FIG. 7 is a block diagram illustrating an example computing device, all arranged in accordance with at least some embodiments of the present disclosure.

FIG. 7 is a block diagram illustrating an example computing device 700 that is arranged in accordance with at least some embodiments of the present disclosure. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include a data result reordering algorithm and/or a collision domain network restriction algorithm 723 that can be arranged to perform the functions and/or operations as described herein including the functional blocks and/or operations described with respect to process 400 of FIG. 4 and/or process 500 of FIG. 5. Program Data 724 may include data request data 725 for use with the collision domain network restriction algorithm 723 and/or may include data result priority data for use with the data result reordering algorithm. In some example embodiments, application 722 may be arranged to operate with program data 724 on an operating system 721 such that implementations of data result reordering and/or collision domain network restriction may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A multicore processor including a plurality of processor cores arranged in multiple collision domain networks, the multicore processor comprising:

a first collision domain network comprising a first set of processor cores of the multicore processor that are configured in communication with one another;

a second collision domain network comprising a second set of processor cores of the multicore processor that are configured in communication with one another;

a domain interconnection network configured to segregate a first plurality of competing communications within the first collision domain network from a second plurality of competing communications within with the second collision domain network, wherein the first collision domain network and the second collision domain network are on a single integrated circuit; and a first traffic management core associated with the domain interconnection network, wherein the first traffic management core is configured to facilitate communications between the domain interconnection network and one or more of the first collision domain network and/or the second collision domain network,
wherein the first traffic management core is configured to facilitate communications between the domain interconnection network and the first collision domain network by restriction of the first collision domain network from the domain interconnection network based at least in part on a determination of excessive data requests by the first collision domain network.

2. The multicore processor of claim 1, wherein the first set of processor cores corresponds to a greater number of the processor cores than the second set of processor cores.

3. The multicore processor of claim 1, wherein the first set of processor cores corresponds to a same number of processor cores as the second set of processor cores.

4. The multicore processor of claim 1, wherein the first set of processor cores in the first collision domain network corresponds to a first type of processor core and the second set of processor cores in the second collision domain network corresponds to a second type of processor core that is different from the first type of processor core.

5. The multicore processor of claim 1, wherein each of the first set of processor cores in the first collision domain network and each of the second set of processor cores in the second collision domain network correspond to a same type of processor core.

6. The multicore processor of claim 1, wherein the first collision domain network and the second collision domain network do not share any processor cores in common.

7. The multicore processor of claim 1, further comprising a second traffic management core associated with the domain interconnection network, wherein the first traffic management core and the second traffic management core are configured to facilitate communications between the domain interconnection network and the first collision domain network.

8. The multicore processor of claim 1, wherein the first traffic management core is configured to facilitate communications between the domain interconnection network and the first collision domain network by reorder forward of a first data result and a second data result to the first collision domain network based at least in part on a priority of the first data result and a priority of the second data result.

9. A computing device including a plurality of processor cores arranged in multiple collision domain networks, the computing device comprising:
a multicore processor including a plurality of processor cores, comprising:
a first collision domain network comprising a first set of the plurality of processor cores arranged in communication with one another;
a second collision domain network comprising a second set of the plurality of processor cores arranged in communication with one another; and
a traffic management core configured to:
facilitate communications with the first collision domain network and with the second collision domain network; and
forward data results from a first level one cache of the traffic management core to a second level one cache of a first processer core in the first set of the plurality of processor cores;
a memory bus; and
a system memory configured in communication with the multicore processor via the memory bus.

10. The computing device of claim 9, wherein the first set of processor cores in the first collision domain network corresponds to a greater number of the processor cores than the second set of processor cores in the second collision domain network.

11. The computing device of claim 9, wherein the first set of processor cores in the first collision domain network corresponds to a first type of processor core and the second set of processor cores in the second collision domain network corresponds to a second type of processor core that is different from the first type of processor core.

12. The computing device of claim 9, wherein the first collision domain network and the second collision domain network do not share any processor cores in common.

13. The computing device of claim 9, wherein the traffic management core is configured to facilitate communications between the memory bus and one or more of the first collision domain network and/or the second collision domain network.

14. The computing device of claim 9, wherein the traffic management core is configured to facilitate communications between the memory bus and the first collision domain network by reorder forward of a first data result and a second data result to the first collision domain network based at least in part on a priority of the first data result and a priority of the second data result.

15. The computing device of claim 9, wherein the traffic management core is configured to facilitate communications between the memory bus and the first collision domain network by restriction of the first collision domain network from the second collision domain network based at least in part on a determination of excessive data requests by the first collision domain network.

16. A method for a multicore processor including a plurality of processor cores arranged in multiple collision domain networks, the method comprising:
receiving, via a traffic management core of the multicore processor, a data request from a first collision domain network, wherein the first collision domain network is associated with a first set of processor cores in the multicore processor and wherein the first collision domain network is a communication region that allows delivery of messages from any processor core within the first collision domain network to any other processor core within the first collision domain network, while delivery of messages outside the first collision domain network pass through a collision blocking interface;
determining, via the traffic management core, when excessive data requests are being received from the first collision domain network based at least in part on the data request; and
restricting, via the traffic management core, the first collision domain network from a domain interconnection network of the multicore processor based at least in part on the determination of excessive data requests, wherein the domain interconnection network is configured to facilitate communications associated with the first collision domain network and with a second collision domain network, wherein the second collision domain network is associated with a second set of processor cores in the multicore processor.

17. The method of claim 16, the method further comprising:
receiving, via the traffic management core, a first data result and a second data result from the domain interconnection network; and
reordering, via the traffic management core, a forwarding of the first data result and the second data result to the first collision domain network based at least in part on a priority of the first data result and a priority of the second data result.

18. A machine-readable non-transitory medium including instructions stored therein that, in response to execution by a multicore processor, operatively enable the multicore processor to:

identify, via a traffic management core of the multicore processor, a first data result and a second data result from a domain interconnection network of the multicore processor, wherein the domain interconnection network is configured to facilitate communications associated with a first collision domain network of the multicore processor and with a second collision domain network of the multicore processor, wherein the first collision domain network is associated with a first set of processor cores in the multicore processor, and wherein the second collision domain network is associated with a second set of processor cores in the multicore processor, wherein the first collision domain network and the second collision domain network are on a single integrated circuit; and reorder, via the traffic management core, a forwarding of the first data result and the second data result to the first collision domain network based at least in part on a priority of the first data result and a priority of the second data result;

identify, via the traffic management core, a data request from the first collision domain network;

determine, via the traffic management core, whether excessive data requests are being received from the first collision domain network based at least in part on the data request; and restrict, via the traffic management core, the first collision domain network from the domain interconnection network based at least in part on the determination of excessive data requests.

* * * * *